United States Patent [19]
Lahti

[11] Patent Number: 4,485,275
[45] Date of Patent: Nov. 27, 1984

[54] INVERTED HORN LOUDSPEAKER

[76] Inventor: Uolevi L. Lahti, 428 Fort Denaud Rd., La Belle, Fla. 33935

[21] Appl. No.: 361,648

[22] Filed: Mar. 25, 1982

[51] Int. Cl.³ .......................... H04M 1/02; H04R 1/30
[52] U.S. Cl. .......................... 179/115.5 H; 179/146 E; 181/152; 181/199; 381/88
[58] Field of Search ............... 179/115.5 H, 115.5 ES, 179/1 E, 115.5 PS, 146 R, 146 E; 181/152, 159, 179, 163, 199, 144; 381/88

[56] References Cited

U.S. PATENT DOCUMENTS

| | | | |
|---|---|---|---|
| 2,642,948 | 6/1953 | Olson | 181/152 |
| 3,135,349 | 6/1964 | Lahti | 179/146 R |
| 3,812,301 | 5/1974 | Lahti | 179/146 R |
| 4,138,594 | 2/1979 | Klipsch | 181/152 |
| 4,301,889 | 11/1981 | Tralonga | 181/199 |

FOREIGN PATENT DOCUMENTS

| | | | |
|---|---|---|---|
| 7907243 | 10/1980 | France | 381/88 |

*Primary Examiner*—Gene Z. Rubinson
*Assistant Examiner*—Danita R. Byrd
*Attorney, Agent, or Firm*—Pollock, Vande Sande & Priddy

[57] ABSTRACT

A loudspeaker includes, in an enclosure, a motor and a diaphragm coupled thereto. An inverted horn couples the surface of the diaphragm through the enclosure. The diaphragm is located in the enclosure with the center line which is parallel to but offset from a center line of the inverted horn.

8 Claims, 5 Drawing Figures

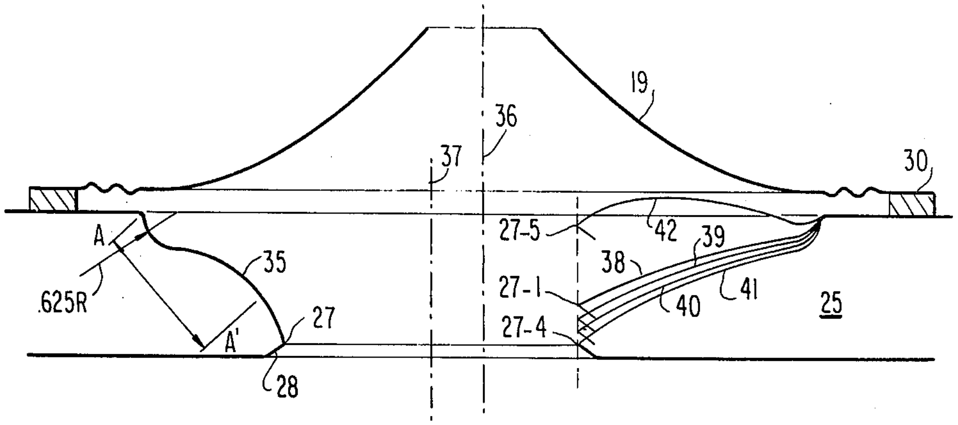
FIG.4
FIG.5
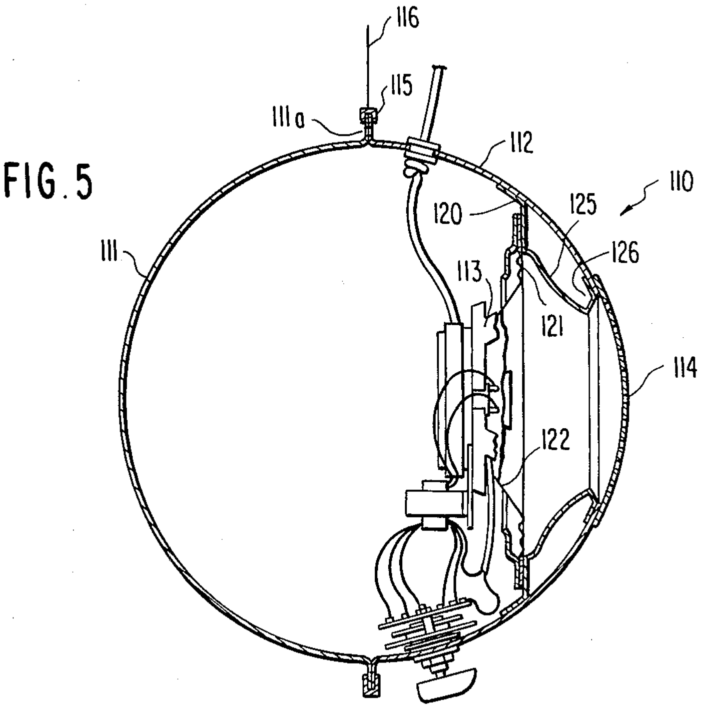

INVERTED HORN LOUDSPEAKER

DESCRIPTION

1. Field of the Invention

The invention relates to a relatively small loudspeaker having unusually good low frequency characteristics, obtained by the use of an inverted horn to couple a diaphragm to the atmosphere.

2. Background Art

In my prior U.S. Pat. Nos. 3,135,349 and 3,812,301, a loudspeaker is disclosed comprising a motor or voice coil, a diaphragm, an enclosure and an inverted horn coupling the diaphragm to the atmosphere. As described in U.S. Pat. No. 3,135,349, the loudspeaker is advantageous in that it provides low frequency characteristics which are equivalent in terms of performance to a much larger speaker. For example, the preferred embodiment disclosed in that patent has outside dimensions of 7¾"×7¾"×about 9¼", and employs basically an 8" speaker. The loudspeaker assembly provides efficient operation down below 60 hertz and has a flat response, ±6 db, from about 55 to 18,000 hertz. Since the typical difficulty in using relatively small speakers is obtaining adequate low frequency response, the speaker described in my previous patent, to a rough approximation, operates as effectively as a 12" speaker at reasonable volume levels.

Desirable qualities in a speaker include output level and distortion, desirably the output level is maximized whereas the distortion is minimized.

As reported in U.S. Pat. No. 3,135,349, the use of the inverted horn results in increasing the velocity of air flowing therethrough by a factor of about 4 to 5 which was the ratio of large to small areas of the horn. This increase in air velocity results in simulating the action of a relatively large, low frequency speaker, but at the same time does not require excessive movement of the actual diaphragm. The greater the movement required of the diaphragm (for example movement required to attain a given velocity), the greater is resulting distortion and therefore it is desirable to minimize the required diaphragm movement.

One source of distortion which is sought to be minimized is caused by resonance. As reported in U.S. Pat. No. 3,135,349, the use of the inverted horn had a tendency to damp out resonances. However, I have now found that resonance (especially resonance caused by cone break up) can be reduced by non-uniformly loading the cone (the horn). While the horn or cone is itself uniform in density, non-uniformly loading it results in its behaving as a variable density cone. This has the advantage of reducing the build up of single frequency resonances.

Furthermore, the inverted horn described in the above-referenced patent was exponential (in longitudinal cross-section). Experimental work leads me to believe that an advantage can be obtained by modifying the exponential format of the horn so that the horn is not strictly exponential. More particularly, my preferred inverted horn (beginning at the diaphragm) has a cross-section of an articulated OGEE curve which, at distances further and further from the diaphragm becomes exponential.

The invention can be applied to either speakers housed in wooden or plastic enclosures or to speakers housed in a porcelanized metal. The latter is advantageous in that while painted metal enclosures are UL approved, the coating is still capable of smoldering and burning. The procelanized metal enclosure will not burn nor smolder.

In some embodiments of the invention further advantages are derived by offsetting the center line of horn and diaphragm. The offset enhances elimination of radical distortion and provides for the non-uniform loading.

It is therefore an object of the invention to improve inverted horn loudspeakers by reducing single frequency resonance. It is another object of the present invention to change the concentric loading of the speaker to enhance the elimination of radial distortion. It is another object of the present invention to provide an inverted horn loudspeaker which includes a motor, diaphragm and support, all located within an enclosure, and further including an inverted horn coupling the diaphragm through the enclosure wall, wherein a center line of the diaphragm is offset with respect to a center line of the inverted horn. It is still a further object of the present invention to provide an inverted horn loudspeaker with significantly improved bass response in which the inverted horn comprises a section of an OGEE curve, and a further section which is exponential. In specific applications the speaker enclosure may be porcelanized metal or other more conventional enclosures.

BRIEF DESCRIPTION OF THE DRAWINGS

The present invention will now be further described so as to enable those skilled in the art to make and use the same in the following portions of this specification when taken in conjunction with the attached drawings in which like reference characters identical apparatus and in which:

FIGS. 1-4 illustrate respectively a perspective view, a cross-section, an exploded view and a line drawing of the loading face plate or horn, of a first embodiment of the invention; and FIG. 5 is a sectional view of another embodiment of the invention.

DETAILED DESCRIPTION OF PREFERRED EMBODIMENTS

Figure 1:
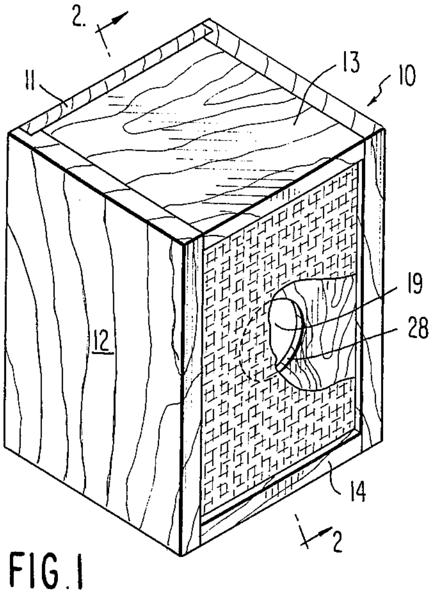

Referring now to the drawings, the reference numeral 10 denotes a case fabricated of heavy fiber-board, perhaps ½" thick. The case 10 includes rearward wall 11, side walls 12, top wall 13, and bottom wall 14 and front wall 15. Total height of a typical structure may be 9¼", depth 7¾" and width about 7¾", outside dimensions. The rear wall 11 has a terminal board 16, for providing audio power to the speaker, which, however, does not present an acoustic opening.

The speaker itself includes a motor 17, a spider 18 and a diaphragm 19 secured to said spider. The speaker is a conventional permanent magnet speaker, which is purchased on the open market. Any such speaker is suitable.

The forward edges of the speaker are pressed against the inside surface of wall 15 by means of a wooden plug 20 (or the like), which extends through rear wall 11 and stiffens the latter by pressing against motor 17. Internally of the case 10 is located a large mass of acoustic damping material 21, such as glass wool, formed by bending a strip of material into a shape generally conforming with the outline of the case 10 and the motor 17 and spider 18, and lying adjacent thereto, but leaving a central mass of air, 22.

The front wall 15 is cut to provide an articulated OGEE curve which is faired into an exponential. The horn 25 can be fabricated out of the wall material itself. The inner opening 26 of the horn 25 conforms approximately in size and shape with the opening of the diaphragm 19. The outer opening 27 is much smaller. The improvement of the invention over my prior U.S. Pat. No. 3,135,349 relates specifically to the shape of the horn itself. Reference is now made to FIG. 4 which illustrates several preferred embodiments of the horn 25.

FIG. 4 is a line drawing illustrating the diaphragm 19 in relation to the outline of the horn 25. To orient the viewer, the axis 36 represents the center line of the diaphragm, the loading face plate 25 is shaped in accordance with the invention to provide a desired horn cross-section. The horn includes a sharp edge 27, as described in my U.S. Pat. No. 3,135,349 as well as the taper 28. The cross-section shown in FIG. 4 differs from my U.S. Pat. No. 3,135,349 in the shape of the horn itself as well as its location relative to the axis 36. More particularly, the horn has an orifice with a center line 37, which is shown in FIG. 4 as offset from, but parallel to, the center line 36 of the diaphragm. In addition to this offset, whereas in my U.S. Pat. No. 3,135,349 the horn had a cross-section of an inverted exponential, the horn whose cross-section is shown in FIG. 4 is an OGEE faired into an exponential. Referring to FIG. 4, the left hand outline of the horn cross-section is, over the distance A—A' an OGEE curve and beyond that is exponential in shape. While the left hand outline of the horn in FIG. 4 is that of a typical cross-section, on the right hand side a family of curves 38–41 are illustrated, each with a different sharp edge 27-1 through 27-4. Although each of the curves 35 and 38–41 is a OGEE faired into an exponential, FIG. 4, on the right, indicates that there are a family of curves available depending on the thickness requirements for the face plate 25.

In addition, for exceptionally limited space requirements, the OGEE/exponential can be inverted as shown for example at 42 wherein the sharp edge opening 27-5 is significantly set back from the other sharp edged openings 27-1 through 27-4. In other words, the inverted horn (outlet smaller than inlet) can have a longitudinal section which may or may not be inverted.

While FIG. 4 shows two features of my invention, i.e. the OGEE/exponential shape to the horn and the offset between the horn center line and diaphragm center line, it should be understood that it is also within the scope of the invention to provide the OGEE/exponential horn cross section in the absence of the offset, that is wherein the orifice and diaphragm center line are coincident.

The offset, if present is selected in the range of $\frac{1}{4}$–$1\frac{1}{2}$ inches depending on the drawer size. The specific offset is selected empirically in the given range with an upper limit of voice coil diameter.

Figure 2:
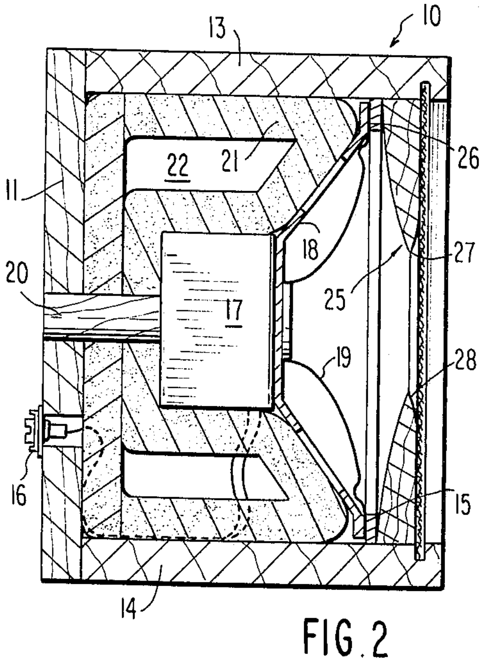
Figure 3:
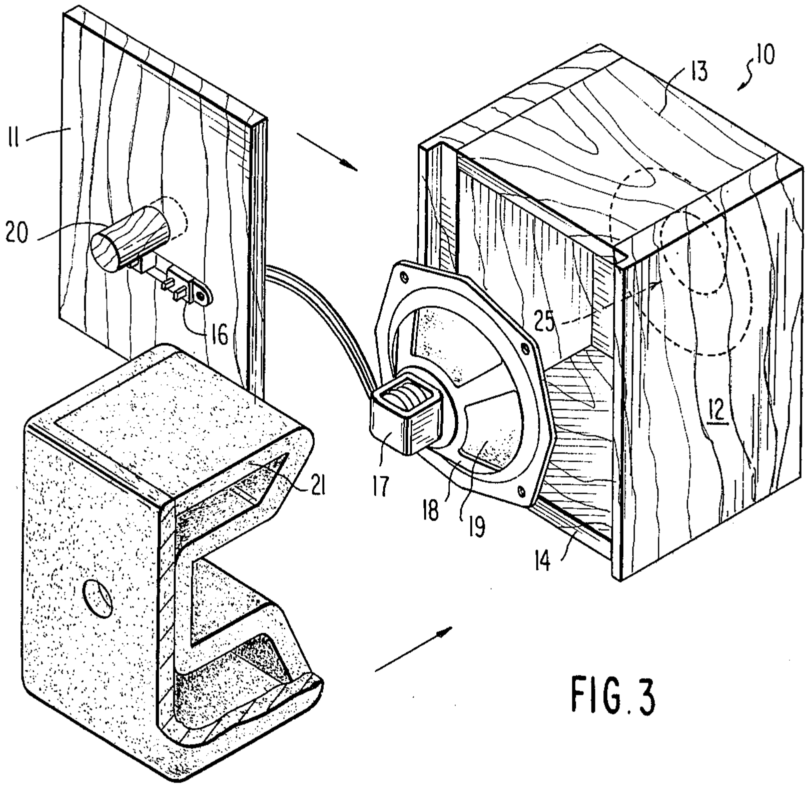

Whereas FIGS. 1–4 illustrate a loudspeaker encased with relatively conventional materials, i.e. wood and/or plastic, it is also within the scope of the invention to use the OGEE/exponential horn cross-section with loudspeakers encased in other materials. In particular, in industrial applications, metal encased loudspeakers are widely used. For aesthetic reasons it is sometimes desirable to coat the metal enclosures, for example with paint. Underwriters Laboratories has approved painted metal enclosures for this application. Nothwithstanding this approval, however, the painted metal enclosures are subject to smoldering and burning, and it is another goal of the invention to provide a loudspeaker with metal enclosure which avoids the potential for smoldering and burning.

This is effected by using rather than painted metal, porcelanized metal, for example porcelanized steel. The techniques for porcelanizing metal are well-known and need not be repeated herein.

FIG. 5 is a cross-section of porcelanized metal enclosure speaker employing the OGEE/exponential horn of FIG. 4 and otherwise having features in common with my prior U.S. Pat. No. 3,812,301.

More particularly, and referring to FIG. 5, 110 is a spherical enclosure fabricated of two co-jointed hemispheres 111 and 112 made of a porcelanized metal such as steel. The front hemisphere 112 serves to mount an electrodynamic loudspeaker 113 which radiates via a grill 114. The rearward hemisphere includes an internal annulus **111*a* extending outwardly of the enclosure 110 and having an opening 115 from which the sphere may be suspended via a wire 116. It is of course not essential that the sphere may be hung. The two hemispheres 111, 112 are of identical diameters and may be joined by a suitable cement or by pop rivets through holes provided on the lip on the areas of overlap, which leaves these areas cemented together when the solvent dries. A chordal annular support 120, which can be made of the same material as the sphere, is welded to the interior of the hemisphere 112 and serves to maintain the rim 121 of a loudspeaker diaphragm 122 of a loudspeaker 113 in place. The annular support 120 is integral with the horn 125, the small end of which is fastened to the internal wall of the hemisphere 112 at 126. Thereby, acoustic energy radiated by the diaphragm 122 is conveyed externally of the enclosure via the horn 125**.

The rearward surface of diaphragm 122 radiates into the interior of the enclosure 110, which serves to load the loudspeaker. Loading is present in that the walls of the enclosure are non-parallel and therefore absorb acoustic energy by dispersion. In so doing they re-radiate and impart to the system an omni-directional radiation pattern. In addition, the enclosure may contain damping material to give the effect of a larger enclosure.

The loudspeaker diaphragm 122 is loaded in at least two distinct ways; one is front loading due to the action of the horn 125, the other is rear loading due to the action of the enclosed air space behind the enclosure, and that effect is enhanced by the stiffness of the enclosure 110, i.e. the energy radiated directly by the enclosure must be supplied by the loudspeaker.

In respects other than the material of the hemispheres 112 and 111, and the cross-section of the horn 125 the loudspeaker shown in FIG. 5 is similar to that shown in the referenced U.S. Pat. No. 3,812,301.

The cross-section of the horn 125 is an OGEE/exponential as is described with respect to FIG. 4. The center line of the orifice of the horn may or may not coincide with the center line of the diaphragm 122.

I claim:

1. A loudspeaker comprising:

an enclosure, a motor, a diaphragm coupled thereto and a support for said diaphragm, all located within said enclosure, an inverted horn coupling a surface of said diaphragm through said enclosure, said diaphragm located in said enclosure with a center line which is parallel to but offset from a center line of said horn.

2. The loudspeaker of claim 1 wherein said inverted horn has a cross-section comprising an articulated OGEE curve.

3. The loudspeaker of claim 1 wherein said inverted horn has a cross-section which is exponential.

4. The loudspeaker of claim 1 wherein a cross-section of said inverted horn includes a portion corresponding to an articulated OGEE curve, and another portion which is exponential.

5. The loudspeaker of any of claims 1–4 in which said offset is in the range of ¼ to 1½ inches.

6. A loudspeaker comprising:

an enclosure, a motor, a diaphragm coupled thereto and a support for said diaphragm, all located within said enclosure, an inverted horn coupling a surface of said diaphragm through said enclosure, said inverted horn having a cross-section comprising an articulated OGEE curve faired into an exponential.

7. The loudspeaker of claim 6 wherein said enclosure comprises porcelanized metal.

8. The loudspeaker of either claim 6 or 7 in which said diaphragm has a center line, and said inverted horn has a center line, and wherein said inverted horn center line is offset from said diaphragm center line

* * * * *